United States Patent
Seibel et al.

(10) Patent No.: US 12,479,954 B2
(45) Date of Patent: Nov. 25, 2025

(54) PROCESS FOR PREPARING A RESORBABLE POLYESTER AS A GRANULATE OR POWDER BY BULK POLYMERIZATION

(71) Applicant: Evonik Operations GmbH, Essen (DE)

(72) Inventors: Manuel Seibel, Bensheim (DE); Jan Hendrik Schattka, Darmstadt (DE); Isabel Wahl, Alzenau (DE); Alena-Davina Max, Griesheim (DE); Elisabeth Ghulam, Muehltal (DE)

(73) Assignee: Evonik Operations GmbH, Essen (DE)

( * ) Notice: Subject to any disclaimer, the term of this patent is extended or adjusted under 35 U.S.C. 154(b) by 1119 days.

(21) Appl. No.: 17/309,392

(22) PCT Filed: Oct. 17, 2019

(86) PCT No.: PCT/EP2019/078142
§ 371 (c)(1),
(2) Date: May 25, 2021

(87) PCT Pub. No.: WO2020/108844
PCT Pub. Date: Jun. 4, 2020

(65) Prior Publication Data
US 2021/0395449 A1  Dec. 23, 2021

(30) Foreign Application Priority Data
Nov. 27, 2018 (EP) .................................... 18208541

(51) Int. Cl.
*C08G 63/78* (2006.01)
*C08G 63/08* (2006.01)
*C08G 63/82* (2006.01)
*C08G 63/88* (2006.01)

(52) U.S. Cl.
CPC ........... *C08G 63/785* (2013.01); *C08G 63/08* (2013.01); *C08G 63/823* (2013.01); *C08G 63/88* (2013.01)

(58) Field of Classification Search
CPC .......... C08G 63/08; C08G 63/78; C08L 67/04
See application file for complete search history.

(56) References Cited

U.S. PATENT DOCUMENTS

| | | |
|---|---|---|
| 4,539,981 A | 9/1985 | Tunc |
| 4,550,449 A | 11/1985 | Tunc |
| 9,790,331 B2 | 10/2017 | Baer et al. |
| 2003/0162894 A1 | 8/2003 | Buchholz et al. |
| 2004/0230026 A1 | 11/2004 | Yamane et al. |
| 2014/0213754 A1* | 7/2014 | Nemoto ................. C08G 63/08 528/355 |
| 2016/0032044 A1 | 2/2016 | Sbriglia et al. |
| 2016/0208057 A1 | 7/2016 | Baer et al. |

FOREIGN PATENT DOCUMENTS

| | | |
|---|---|---|
| EP | 1 413 592 | 4/2004 |
| EP | 1 468 035 | 7/2005 |
| EP | 2 039 714 | 3/2009 |
| EP | 2455415 A1 * | 5/2012 ............. C08G 63/08 |

OTHER PUBLICATIONS

European Search Report issued Jun. 13, 2019 in European Application No. 18208541.5, 6 pages.
International Search Report issued Dec. 9, 2019 in PCT/EP2019/078142.
Written Opinion issued Dec. 9, 2019 in PCT/EP2019/078142.
Israeli Office Action dated Dec. 28, 2023, in Israeli Application No. 283389, 4 pages.

* cited by examiner

*Primary Examiner* — Gregory Listvoyb
(74) *Attorney, Agent, or Firm* — Grüneberg and Myers PLLC

(57) ABSTRACT

A process can prepare a bio-resorbable polyester as a granulate or powder by bulk polymerization of one or more monomer(s). The process involves a) filling a monomer granulate, containing the one or more monomer(s), into a container; b) adding a polymerization catalyst and a chain length moderator on top of the monomer granulate; c) adding further monomer granulate on top; d) closing the container; e) carrying out a polymerization reaction in the closed container at a temperature in the range of 50° C. to 170° C., wherein a solid polymer in the form of a polymer block is formed; f) removing the polymer block from the container; and g) comminuting the polymer block to a granulate or powder; wherein the container is an unstirred container, wherein steps b) and c) are carried out once or are repeated, and wherein steps a) to e) are carried out under inert atmosphere.

21 Claims, No Drawings

PROCESS FOR PREPARING A RESORBABLE POLYESTER AS A GRANULATE OR POWDER BY BULK POLYMERIZATION

CROSS-REFERENCE TO RELATED APPLICATIONS

This application is the National Stage entry under § 371 of International Application No. PCT/EP2019/078142, filed on Oct. 17, 2019, and which claims the benefit of priority to European Application No. 18208541.5, filed on Nov. 27, 2018. The content of each of these applications is hereby incorporated by reference in its entirety.

BACKGROUND OF THE INVENTION

Field of the Invention

The invention is in the field of bio-resorbable polyesters and processes for making them.

Description of Related Art

Bio-resorbable or reabsorbable polyesters with a very high molecular weight are usually produced by bulk polymerization. EP1468035B1 discloses a process for preparing reabsorbable polyesters by bulk polymerization, wherein the reaction components are melted and homogenized in a stirred reactor, the reaction mixture is then transferred into a number of smaller-volume containers, the reaction mixture is polymerized in these containers and the polyester obtained is isolated by removing it from the containers.

A preferred process of EP1468035B1 comprises the following steps:
(a) Melting the monomer(s) in a stirred reactor;
(a1) adding the catalyst;
(a2) optionally adding a chain length moderator;
(a3) homogenizing the reaction mixture using a stirrer;
(b) transferring the reaction mixture into smaller plastic containers through a system of tubes;
(c) carrying out the polymerization reaction in the plastic containers until the desired degree of reaction of the polymerization is achieved;
(d) removing the polymer block formed from the plastic container.

It has been found that the steps a) to b) are elaborate, critical and time consuming. Especially the pre-cleaning of the stirred reactor, applying inert atmosphere, the filling of the reactor, melting the monomer(s) adding the catalyst and optionally adding the chain length moderator in the stirred reactor; and the transfer of the reaction mixture into smaller plastic containers through a system of tubes under GMP-conditions (Good manufacturing practice) require high efforts and skills.

Therefore, a simplified process for preparing a resorbable polyester as a granulate or powder by bulk polymerization should be provided.

SUMMARY OF THE INVENTION

It has been surprisingly found that the step of (a) melting the monomer(s) in a stirred reactor, especially homogenizing the reaction mixture using a stirrer, can be omitted and substituted by a simple reaction mixture of the solid monomer(s), the catalyst and the chain length moderator in the (small) unstirred containers. Surprisingly, after the process variations of the inherent viscosity (IV) in individual containers are still within the product specifications. Thus, the mixing process of solid monomer(s), catalyst and the chain length regulator in small containers by the thermal conversion during the polymerization process seems to be apparently sufficient for a homogeneous polymerization reaction, which was by no means to be expected. The proposed simplified process provides easier handling and overall less risks of contamination under GMP conditions. The reduced workload is also an economic improvement.

DETAILED DESCRIPTION

As discussed above, differing from EP1468035B1, it has been surprisingly found that the step of (a) melting the monomer(s) in a stirred reactor, especially homogenizing the reaction mixture using a stirrer can be omitted and substituted by a simple reaction mixture of the solid monomer(s), the catalyst and the chain length moderator in the unstirred containers.

The examples 1 and 5 of the present application show that the best results are achieved when the polymerization catalyst and the chain length moderator are placed in an unstirred container in the middle of the monomer granulate. The desired polymer specification is achieved in examples 1 and 5.

The comparative examples 2, 3 and 4 of the present application show that the polymer specification is not reached when the polymerization catalyst and the chain length moderator are placed in an unstirred container on top of the monomer granulate. However, in comparative example 4 the polymer specification as such is achieved except for the appearance of a plate with higher molecular weight within the besides homogeneous polymer material. This leads to an embodiment where the polymerization catalyst and the chain length moderator are not placed on top of the monomer granulate but are at least embedded or covered by the monomer granulate, even if not placed in the middle or the center.

A most rational approach seems to place the whole amount of polymerization catalyst and chain length moderator in one portion, which becomes then embedded by the monomer granulate. However in another approach, the whole amount of polymerization catalyst and chain length moderator may be splitted and added sequentially in several sub-portions as well. Each sub-portion may then be covered by a further portion monomer granulate, so that a layered system results.

The invention is concerned with a Process for preparing a bio-resorbable polyester as a granulate or powder by bulk polymerization of one or more monomer(s), comprising the steps a) to g):
a) filling a monomer granulate, comprising the one or more monomer(s), into a container,
b) adding a polymerization catalyst and a chain length moderator on top of the monomer granulate,
c) adding further monomer granulate on top of the polymerization catalyst and the chain length moderator,
d) closing the container,
e) carrying out a polymerization reaction in the closed container at a temperature in the range of 50° C. to 170° C., preferably in the range of 100 to 150° C., wherein a solid polymer in the form of a polymer block is formed,
f) removing the polymer block from the container,
g) comminuting the polymer block to a granulate or powder, wherein the container is an unstirred container, wherein steps b) and c) are carried out once or are repeated, and wherein the steps a) to e) are carried out under inert atmosphere.

All steps, except for step e), should be carried out at a temperature where no polymerization process starts or is going on, preferably at room temperature, for instance in the range of 10 to 40° C. or 20 to 25° C.

A preferred process for preparing a bio-resorbable polyester as a granulate or powder by bulk polymerization of one or more monomer(s) comprises the following steps a) to g):

a) filling a first amount of the monomer granulate of 10 to 90, preferably 20 to 80% by weight of from a total amount of 100% by weight into a container, b) adding a polymerization catalyst and a chain length moderator on top of the monomer granulate in the container, c) adding a second amount of the monomer granulate of the one or more monomer(s) into the container, so that the first amount and the second amount add up to 100% by weight, wherein the second amount of monomer granulate covers the polymerization catalyst and the chain length moderator on top of the monomer portion from step a), d) closing the container, e) carrying out a polymerization reaction in the closed container at a temperature in the range of 50° C. to 170° C., preferably in the range of 100 to 140° C., wherein a solid polymer in the form of a polymer block is formed, f) removing the polymer block from the container, g) comminuting the polymer block to a granulate or powder, wherein the container is an unstirred container, wherein steps b) and c) are carried out once, and wherein the steps a) to e) are carried out under inert atmosphere.

All steps, except for step e) may be carried out at 10 to 40° C., where no polymerization process starts or is going on, preferably at room temperature, for instance in the range of 10 to 30° C. or 18 to 25° C.

Bio-Resorbable Polyester

The term "bio-resorbable" in "bio-resorbable polyester" means that a polyester, which is preferably a lactic acid based polymer, and which is after implantation or injection in the human body or in the body of an animal in contact with the body fluids broken down into oligomers in a slow hydrolytic reaction. Hydrolysis end-products such as lactic acid or glycolic acid are metabolized into carbon dioxide and water. Other exchangeable expressions for the term "bio-resorbable polyester" which are often used are "resorbable polyester", "reabsorbable polyester", "bio-degradable polyester" or "adsorptive polyester".

The preferred one or more monomers (bio-resorbable monomers) from which the bio-resorbable polyester is polymerized are bio-resorbable and those which can be polymerised by ring-opening polymerization of the corresponding cyclic monomers, for example L-lactide, D-lactide, DL-lactide, meso-lactide, glycolide, trimethylene carbonate (TMC) and epsilon-caprolactone.

Homopolyesters selected from among the polyglycolides, particularly poly(L-lactide) or poly(DL-lactide), are preferred.

The bio-resorbable polyester may be selected from the group of a poly(L-lactide), a copolymer of D- and L-lactides, a copolymer of L-lactide and DL-lactide, a poly(DL-lactide), a copolymer of glycolide and trimethylene carbonate, a copolymer of lactide and glycolide, a copolymer of DL-lactide or L-lactide with glycolide, a copolymer of lactide and trimethylene carbonate, is a copolymer of lactide and epsilon-caprolactone.

An example of a "high molecular" polylactide is the bio-resorbable polyester RESOMER® L 210S which is a poly(L-lactide) with an inherent viscosity IV specification from 3.25 to 4.34 dL/g. An example of a "middle molecular" polylactide is the bio-resorbable polyester RESOMER® L 207 S which is a poly(L-lactide) with an inherent viscosity IV specification from 1.45 to 2.04 dL/g. An example of a low molecular polylactide is the bio-resorbable polyester RESOMER® L 206 S which is a poly(L-lactide) with an inherent viscosity IV specification from 0.75 to 1.24 dL/g.

The specification for residual monomers (REMO) is usually for all bio-resorbable polyesters 0.3% by weight or below.

Also preferred are copolyesters selected from the following groups: polylactides which may be obtained from various stereoisomeric lactides, particularly copolyesters of L-lactide and DL-lactide, copolyesters of glycolide or lactide and trimethylene carbonate, copolyesters of lactide, particularly DL-lactide or L-lactide and glycolide, copolyesters of lactide and epsilon-caprolactone. Also preferred are terpolymers which are obtained from three different cyclic monomers.

At the end of the process the block of the bio-resorbable polyester is comminuted in step e) to a granulate or powder. The granulate may have a mean particle size in the range from about 0.5 to 3 mm. Comminuting may be performed by a milling equipment.

Bulk Polymerization

A number of techniques for the ring-opening polymerisation of lactides and related lactones are also known from the prior art. Fusion polymerisation, bulk polymerisation, solution polymerisation and suspension polymerisation are described, for example (e.g. J. Nieuwenhuis, Clinical Materials, 10, 59-67, 1992). Of these, fusion and bulk polymerisation are of the greatest technical importance. The difference between the two techniques is the reaction temperature. Whereas all the reaction components are in a molten state in fusion polymerisation, the bulk polymerisation is carried out at a temperature situated between the melting points of the particular monomer and polymer. Depending on the type of monomer/polymer, the temperature during bulk polymerisation may be between about 50° C. and 170° C.

The advantage of bulk polymerisation over fusion polymerisation is the lower reaction temperature: because of the more moderate temperature side reactions occur to a considerably lesser extent. Side reactions during polymerisation are detrimental as they cause chain termination in the growth reaction and thereby reduce the molecular weight in the polymer. Bio-resorbable polyesters with a very high molecular weight can therefore only be produced by bulk polymerisation and not in a melt. The high reaction temperatures of the fusion polymerisation also have the drawback that the resulting polymers may have some discoloration. These impurities produced at high temperatures are generally polymer-bound and therefore cannot be removed from the product in a subsequent purification step. With respect to the preferred use of the polyesters in the human body it is advantageous to avoid every kind of contamination.

Another advantage of a low reaction temperature may be the suppression of transesterifications during the polymerisation. In this way it is possible to prevent strong randomisation of the monomer sequences during copolymerisation. Because of the different reactivities of the individual monomers, copolymers with a block-like sequence can be produced at low temperature. It is known, particularly with regard to poly(L-lactide), for instance from U.S. Pat. Nos. 4,539,981 and 4,550,449, that by a suitable choice of the reaction conditions such as the reaction time and temperature as well as the concentration of the catalyst and the chain length moderator, the bulk polymerisation can be controlled accordingly in terms of the molecular weight of the reaction product and the speed of the reaction.

Polymerization Catalyst

The catalyst or polymerization catalyst catalyzes the polymerization process. In most cases a minimum temperature of 50° C. or more is required until the catalyst can have an effect on the polymerization process of the monomers, which is preferably a ring-opening polymerization process.

The catalyst may be added as it is or preferably as a solution in an inert and physiologically acceptable diluent. Aliphatic or aromatic hydrocarbons are preferred, particularly toluene or xylene.

Depending on the nature of the catalyst and the optional chain length moderator, the catalyst may also be dissolved in the chain length moderator.

Preferred catalysts are tin or zinc compounds, while tin(II)halides, such as tin(II)chloride and tin(II)alkoxides, such as tin(II)octanoate or tin(II)ethylhexanoate are most particularly preferred. The additives used to regulate the chain length are compounds such as aliphatic alcohols, acids, hydroxycarboxylic acids and the esters thereof, water or oligomeric lactides. Water, lactic acid, oligomeric lactic acid, ethyl lactate or dodecanol are preferred.

A preferred catalyst is Tin(II) 2-ethylhexanoate. A preferred combination of chain length moderator and catalyst is dodecanol and Tin(II) 2-ethylhexanoate.

In the process, the catalysts are preferably used in low concentrations in order to minimize the development of heat during the polymerization by keeping the reaction speed low. Moreover, the use of small amounts of catalyst is advantageous with respect to the use of the polyesters in the human body. In the case of tin compounds the preferred concentrations are 1 to 200 ppm, most preferably 5 to 100 ppm, particularly 10 to 50 ppm by weight calculated on the total monomer weight.

Chain Length Moderator

The chain length moderator is added to influence the resulting molecular weight of the resulting bio-resorbable polyester together with the catalyst.

The preferred concentration of the chain length moderator depends on the structure of the moderator and the desired molecular weight of the polymer and may be 500 to 8,000 ppm by weight, based on weight the monomers at the start of the process.

Chain length moderators may be selected from aliphatic alcohols, such as ethanol or dodecanol, hydroxycarboxylic acids, such as glycol or lactic acid. Also oligomeric lactic acids or water have proved suitable, inter alia. A preferred chain length moderator is dodecanol.

Predetermined Amount of Polymerization Catalyst and Chain Length Moderator

A predetermined amount of polymerization catalyst and chain length moderator may be any combination of 1 to 200, most preferably 5 to 100, particularly 10 to 50 ppm by weight of polymerization catalyst with 500 to 10,000, preferably 500 to 1,500 ppm by weight of chain length moderator calculated on the total monomer weight.

Inert Atmosphere

Throughout the reaction the air space above the reaction mass is made inert by means of an inert anhydrous gas. Argon, helium and nitrogen are preferred, of which nitrogen is particularly preferred. The steps a) to e) are carried out under inert atmosphere.

Room Temperature

All process steps, except for step e), may be carried out at about 10 to 40° C., where no polymerization process starts or is going on, preferably at room temperature, for instance in the range of 10 to 30° C., preferably in the range of 20 to 25° C.

Unstirred Container

The container is an unstirred container. An unstirred container is a container without stirring equipment or not equipped with a stirring. The container may in principle have any form and may have preferably means to be tightly closed. A typical container may be an (essentially) cylindrical bottle with a thread for a screw cap. The (essential) cylindrical form may be round or angled. The thread fits to a screw cap by which means the bottle can be closed tightly.

The unstirred container may be made of materials like plastic or steel, which are chemically and thermally stable at the reaction temperatures that may be used for the process. Containers made from plastics, may be selected from among the polyolefins, polycarbonates or fluorinated and partly fluorinated plastics. Polypropylene and polytetrafluoroethylene (Teflon®) are preferred. The internal volume of the container may be in the range from 50 ml to 10 liters, preferably in the range from 250 ml to 2.5 liters, most preferably in the range from 500 ml to 1.2 liters, particularly about 1 liter.

A suitable container may have an (essentially) cylindrical form, preferably may be a cylindrical polypropylene bottle with a volume of 1 to 2 liters with a screw cap. The ratio of the height of the (essentially) cylindrical part of the container, respectively a container which is a bottle, to the diameter of the cylindrical part may be from about 1:1 to 5:1, preferably from about 2:1 to 4:1. The dimension of a typical (essentially) cylindrical and about 1 liter bottle may be about 20 cm in total height and about 7 cm in diameter. The cylindrical part from the bottom upwards may have a height of about 17 cm from where the bottle may be tapered and ends up at the top with a thread for a screw cap ("essentially cylindrical" form). The bottle can be tightly closed with the screw cap. In a large scale process usually more than one, especially a number of containers, maybe ten to twenty, may be employed in the same process as disclosed here.

Monomers and Reaction Temperatures

The monomer granulate, comprising one or more monomer(s), the polymerization catalyst and the chain length moderator form the reaction mixture.

The reactions are generally carried out at a temperature in the range of about 50° C. to 170° C., preferably in the range of about 60° C. and 160° C., particularly in the range of 100° C. to 150° C. The preferred (and particularly preferred) reaction temperatures may depend on the particular monomer or monomer mixtures and may be, for example, for:

| | |
|---|---|
| L-lactide: | 105 to 150° C. (110 to 130° C.) |
| D-lactide. | 105 to 150° C. (110 to 130° C.) |
| DL-lactide: | 125 to 150° C. (130 to 140° C.) |
| meso-lactide: | 60 to 150° C. (90 to 140° C.) |
| L/DL-lactide | 110 to 150° C. (115 to 140° C.) |
| L-lactide/TMC | 105 to 150° C. (110 to 140° C.) |
| L-lactide/epsilon-caprolactone: | 105 to 150° C. (110 to 130° C.) |
| DL-lactide/TMC. | 110 to 150° C. (110 to 130° C.) |
| L-lactide/glycolide: | 105 to 150° C. (105 to 120° C.) |
| DL-lactide/glycolide | 110 to 150° C. (110 to 130° C.) |
| glycolide: | 130 to 170° C. (140 to 170° C.) |
| glycolide/TMC: | 110 to 170° C. (120 to 160° C.) |

The reactions are preferably carried out isothermically. In some cases, however, it is advantageous to start at lower temperatures in order to avoid strongly exothermic reactions, and to raise the temperature as the reaction proceeds in order to increase the speed of reaction of the monomers. This applies particularly to polymerization involving monomers of comparatively low reactivity such as trimethylene carbonate or epsilon-caprolactone.

Reaction Time

The reaction times required in step e) depend on the reactivity of the monomer or monomers, the temperature selected and the concentration of catalyst and the required degree of conversion. Reaction times of 5 hours up to 15 days, preferably 1 to 10 days, more preferred 2 to 9 days, most preferred 3 to 15 or 3 to 7 days are preferred.

Desired Degree of Polymerization

A desired degree of polymerization is reached when a solid polymer in the form of a polymer block has been formed inside the container. The form of the polymer block corresponds to the form of the container, respectively the form given by the inner volume of the container that was filled with the reaction mixture. When for instance a bottle with an essentially or mainly cylindrical form is used as a container, the polymer block will have an essentially or mainly cylindrical form.

As a rule, the desired degree of polymerization is reached respectively a solid polymer block has been formed when, of the monomers used, less than 10% by weight, preferably 0 to 9% by weight, most preferably 0.1 to 7% by weight, particularly 0.2 to 5% by weight are present in the polymer (as residual monomers (REMO)). Preferably, the desired degree of polymerization may be reached after a reaction time of 3 to 15 days or 3 to 7 days, preferably 3 to 7 days at 100 to 140° C., preferably at 4 to 6 days at 110 to 130° C.

Inherent Viscosity (IV)

The polyesters prepared by the process according to the invention generally have a mean inherent viscosity IV (Ubbelohde viscosimeter, chloroform, 0.1%, 25° C.) in the range of 0.5 to 8 dl/g, preferably of 0.6 to 5 dl/g.

The Inherent viscosity (IV) is preferably determined in an Ubbelohde viscometer of type 0c at 25° C. utilizing a sample concentration of 0.1% dissolved in chloroform.

Process Steps

The invention is concerned with a process for preparing a bio-resorbable polyester as a granulate or powder by bulk polymerization of one or more monomer(s), comprising the steps a) to g):
a) filling a monomer granulate, comprising the one or more monomer(s), into a container,
b) adding a polymerization catalyst and a chain length moderator on top of the monomer granulate,
c) adding further monomer granulate on top of the polymerization catalyst and the chain length moderator,
d) closing the container,
e) carrying out a polymerization reaction in the closed container at a temperature in the range of 50° C. to 170° C., preferably in the range of 100 to 150° C., wherein a solid polymer in the form of a polymer block is formed,
f) removing the polymer block from the container,
g) comminuting the polymer block to a granulate or powder,
wherein the container is an unstirred container, wherein steps b) and c) are carried out once or are repeated, and wherein the steps a) to e) are carried out under inert atmosphere.

A preferred process is a process for preparing a bio-resorbable polyester as a granulate or powder by bulk polymerization of one or more monomer(s), comprising the steps a) to g):
a) filling a first amount of the monomer granulate of 10 to 90, preferably 20 to 80% by weight of from a total amount of 100% by weight into a container,
b) adding a polymerization catalyst and a chain length moderator on top of the monomer granulate in the container,
c) adding a second amount of the monomer granulate of the one or more monomer(s) into the container, so that the first amount and the second amount add up to 100% by weight, wherein the second amount of monomer granulate covers the polymerization catalyst and the chain length moderator on top of the monomer portion from step a),
d) closing the container,
e) carrying out a polymerization reaction in the closed container at a temperature in the range of 50° C. to 170° C., preferably in the range of 100 to 150° C., wherein a solid polymer in the form of a polymer block is formed,
f) removing the polymer block from the container,
g) comminuting the polymer block to a granulate or powder,
wherein the container is an unstirred container, wherein steps b) and c) are carried out once, and wherein the steps a) to e) are carried out under inert atmosphere.

The invention is concerned with a process for preparing a bio-resorbable polyester as granulate or powder by bulk polymerization, comprising the steps a) to g):

Step a)

Step a) filling a monomer granulate comprising one or more monomer(s) into an unstirred container.

In step a) a first portion of the monomer granulate is filled into the unstirred container. Preferably a first amount of monomer granulate of 10 to 90, preferably 20 to 80, more preferably 30 to 70 or most preferably 40 to 60% by weight of from a total amount of 100% by weight is filled into a container. If the total amount (100%) is for instance 800 g monomer granulate, in step a) the first amount of granulate could be 400 g (50% by weight). The filling is performed under inert atmosphere and preferably at room temperature (at about 10 to 40° C., for instance in the range of 10 to 30° C., preferably in the range of 20 to 25° C.). Usually, first the container, for instance a polypropylene bottle, is overlaid with inert atmosphere, preferred with nitrogen. Then the monomers, usually in granulate form, are filled in the container. In step a) the container is filled in the range of about 40 to 80% of the theoretical possible filling volume, depending on the total inner volume of the container. A suitable container may be a cylindrical polypropylene bottle with a volume of 1 to 2 liters with a screw cap. The dimension of a typical cylindrical 1 liter bottle may be about 20 cm in height and about 7 cm in diameter. The cylindrical part may end at a height of about 17 cm from where the bottle is tapered and ends up at the top with a thread for a screw cap. The bottle can be tightly closed with the screw cap.

Step b)

Step b): Adding a polymerization catalyst and a chain length moderator on top of the monomer granulate in the unstirred container, preferably a 0.5 to 1.2 liter bottle.

The addition in step b) is performed under inert atmosphere and preferably at room temperature. The catalyst and a chain length moderator are added at (predetermined)

proportions that effect the desired polymerization of the monomers. A suitable proportion of the catalyst to be added may be 1 to 200 ppm in relation to the weight of the monomers. A suitable proportion of the chain length moderator to be added may be from about 500 to 8.000 ppm in relation to the weight of the monomers. A suitable combination of chain length moderator and catalyst is dodecanol and Tin(II) 2-ethylhexanoate.

The chain length moderator, for instance the liquid dodecanol and a solid catalyst, for instance Tin(II) 2-ethylhexanoate, that may be dissolved in a small volume of solvent such as toluene, may be mixed and poured with the help of a syringe through the opening for the screw cap dropwise on top and preferably in the middle of the monomer granulate. For instance in a 1 liter bottle with about 7 cm diameter of the cylindrical part there is usually a distance in the horizontal of about 2 to 3 cm between the poured added liquid and the inner wall of the container. For example for about 800 g of monomer granulate, such as a L-lactide, a liquid mixture of 0.6 to 0.7 g chain length moderator dodecanol and the 0.040 to 0.045 g catalyst Tin(II) 2-ethylhexanoate in 2 ml toluene may be adequate and contained in volume of about 3 ml.

Step c)

Step c): Adding further monomer granulate on top of the monomer granulate on top of which the polymerization catalyst and the chain length moderator are already present.

By doing so the polymerization catalyst and the chain length moderator become covered or embedded by monomer granulate. When only a sub-portion of the polymerization catalyst and the chain length moderator is added, the steps b) and c) may be repeated as long as the whole amount is placed within the monomer granulate. Steps b) and c) may be repeated for instance once, twice or three times. The advantage of repeating steps b) and c) is an even better distribution of the polymerization catalyst and the chain length moderator within the monomer granulate. If steps b) and c) are performed only once, a second amount of a monomer granulate is added, so that the first amount and the second amount add up to 100% by weight, wherein the second amount of monomer granulate covers the polymerization catalyst and the chain length moderator on top of the monomer portion from step a), wherein step c), as step a) and b), is carried out under inert atmosphere and preferably at room temperature. If, for instance, a total amount of 800 g monomer granulate shall be polymerized and in step a) 400 g were filled into the container and in step b) the chain length moderator and the catalyst were added, then in step c) the residual second amount of 400 g monomer granulate is added. In this case the chain length moderator and the catalyst are placed more or less in the middle of the monomer granulate.

Step d)

In step d) the unstirred container is closed, for instance by means of a screw cap, e.g. by turning the screw cap tight. Step d) is carried out under inert atmosphere and preferably at room temperature.

Step e)

Step e) is carried out under inert atmosphere and preferably at room temperature. The term "step e) is carried out under inert atmosphere" shall be understood as follows: Steps a) to d) are already carried out under inert atmosphere. In step d) the container is closed tightly, thus the inert atmosphere from step d) is still present inside the container at the start of step e). In the case of metal container, which, after its closure in step d), is absolutely tight against the intrusion of the oxygen containing air atmosphere from outside during the polymerization process step e), there is no need to keep the container under an additional provided external inert atmosphere during step e). The inert atmosphere from step d) inside the container will be maintained during step e). In this case step d) is carried out under inert atmosphere enclosed in the container.

In the case of a plastic container, for instance a polypropylene bottle, which is not absolutely tight against intrusion of the oxygen containing air atmosphere from outside during the polymerization process step e), it is necessary to add an external inert atmosphere that covers the container from outside. This prevents the intrusion of oxygen containing air into the container. In this case the inert atmosphere originating from step d) in the container is not sufficient, since there would be a gas exchange with the environment during step e). Thus the inert atmosphere in the container must be maintained during step e) by placing the container itself under an external inert atmosphere.

In step e), the polymerization reaction is carried out in the closed container at a temperature in the range of 50° C. to 170° C., preferably in the range of 100 to 150° C., most preferably in the range of 100 to 140° C., until the desired degree of reaction of the polymerization is achieved. For this purpose, the closed container may be transferred to a thermostat equipment, preferably an oven.

The thermostat equipment or oven is preferably internally provided with inert atmosphere, preferably with a nitrogen stream. At the reaction temperature the monomer granulate melts and the polymerization catalyst and the chain length moderator diffuse into the monomer mass. As shown in example 5, the container may be placed in upright position (standing or vertical) or in laying position (horizontal). The oven may further be internally equipped with a shaking or a rotating equipment that allows the shaking or rotating of the containers with their reaction mixture during the whole or only a part of the polymerization process duration.

As a rule, the desired degree of polymerization may be reached when, of the monomers used, less than 10% by weight, preferably 0 to 9% by weight, most preferably 0.1 to 7% by weight, particularly 0.2 to 5% by weight are present in the polymer obtained by the process according to the invention. At a temperature in the range of 50° C. to 170° C., preferably in the range of 100 to 140° C., the monomer granulate becomes first liquid. After the desired degree of reaction of the polymerization is achieved the liquid monomer becomes a solid polymer block.

Step f)

In step f), the polymer block is removed from the container. In the case of a container which is a plastic bottle, the wall of the bottle can be cut by a knife and be removed to set the polymer block free.

Step g)

In step g), the polymer block is comminuted to a granulate or powder, usually by breaking the block, for instance by means of a hammer or the like inside a plastic bag, into smaller pieces that can be further processed by a milling equipment. The resulting granulate or powder may have a particle size D50 in the range from about 0.01 to 5 mm. Granulates may have a particle size D50 in the range from about 0.01 up to less than 0.5 mm. Powders may have a particle size D50 in the range from about 0.5 mm up to 5 mm.

The determination of the particle size may be performed according to the United States Pharmacopeia 36 (USP) chapter <429> and the European Pharmacopeia 7.0 (EP) chapter 2.9.31. The particle size distribution was determined utilizing a laser scattering instrument (e.g. Fa. Sympatec GmbH, type HELOS equipped with RODOS dry dispersing unit). The laser diffraction method is based on the phenomenon that particles scatter light in all directions with an intensity pattern that is dependent on particle size. A representative sample, dispersed at an adequate concentration in a suitable liquid or gas, is passed through the beam of a monochromic light source usually from a laser. The light scattered by the particles at various angles is measured by a multi-element detector, and numerical values relating to the scattering pattern are then recorded for subsequent analysis. The numerical scattering values are then transformed, using an appropriate optical model and mathematical procedure, to yield the proportion of total volume to a discrete number of size classes forming a volumetric particle size distribution (e.g. D50 describes a particle diameter corresponding to 50% of cumulative undersize distribution).

Carbon Dioxide ($CO_2$) Extraction of Residual Monomer (REMO)

Optionally residual monomer from the resulting granulate or powder from step g) may be extracted preferably by means of $CO_2$ extraction.

Residual monomer from the resulting granulate or powder from step g) may be extracted preferably by means of applying $CO_2$ in supercritical stage. For this purpose the polymer granulate or powder may be filled in a cartridge and $CO_2$ in supercritical stage, preferred at 65 to 75 bar and 30 to 50° C., may be passed as a stream through the cartridge.

The residual monomer concentration of the bio-resorbable polyester is preferably 3.0% by weight or less.

Items

The invention is concerned with following items

Item 1: Process for preparing a bio-resorbable polyester as a granulate or powder by bulk polymerization of one or more monomer, preferably selected from L-lactide, D-lactide, DL-lactide, meso-lactide, glycolide, trimethylene carbonate (TMC) and epsilon-caprolactone, comprising the steps a) to g):

a) filling a monomer granulate, comprising the one or more monomer(s), into a container,
b) adding a polymerization catalyst and a chain length moderator on top of the monomer granulate,
c) adding further monomer granulate on top of the polymerization catalyst and the chain length moderator,
d) closing the container,
e) carrying out a polymerization reaction in the closed container at a temperature in the range of 50° C. to 170° C., preferably in the range of 100 to 150° C., wherein a solid polymer in the form of a polymer block is formed,
f) removing the polymer block from the container,
g) comminuting the polymer block to a granulate or powder,
wherein the container is an unstirred container, wherein steps b) and c) are carried out once or are repeated, and wherein the steps a) to e) are carried out under inert atmosphere.

2. A process according to item 1, comprising
a) filling a first amount of the monomer granulate of 10 to 90, preferably 20 to 80% by weight of from a total amount of 100% by weight into a container,
b) adding a polymerization catalyst and a chain length moderator on top of the monomer granulate in the container,
c) adding a second amount of the monomer granulate of the one or more monomer(s) into the container, so that the first amount and the second amount add up to 100% by weight, wherein the second amount of monomer granulate covers the polymerization catalyst and the chain length moderator on top of the monomer portion from step a),
d) closing the container,
e) carrying out a polymerization reaction in the closed container at a temperature in the range of 50° C. to 170° C., preferably in the range of 100 to 140° C., wherein a solid polymer in the form of a polymer block is formed,
f) removing the polymer block from the container,
g) comminuting the polymer block to a granulate or powder,
wherein the container is an unstirred container, wherein steps b) and c) are carried out once, and wherein the steps a) to e) are carried out under inert atmosphere.

3. Process according to item 1, wherein residual monomer from the resulting granulate or powder from step g) is extracted by means of $CO_2$ extraction.

4. Process according to one or more of items 1 to 3, wherein the polymer has an inherent viscosity IV in the range of 1 to 12 dl/g.

5. Process according to one or more of items 1 to 4, wherein the bio-resorbable polyester is a polylactide or polyglycolide.

6. Process according to one or more of items 1 to 5, wherein the bio-resorbable polyester is poly(L-lactide).

7. Process according to one or more of items 1 to 6, wherein the bio-resorbable polyester is a copolymer of D- and L-lactides.

8. Process according to one or more of items 1 to 7, wherein the bio-resorbable polyester is a copolymer of L-lactide and DL-lactide.

9. Process according to one or more of items 1 to 8, wherein the bio-resorbable polyester is poly(DL-lactide).

10. Process according to one or more of items 1 to 9, wherein the bio-resorbable polyester is a copolymer of glycolide and trimethylene carbonate.

11. Process according to one or more of items 1 to 10, wherein the bio-resorbable polyester is a copolymer of lactide and glycolide.

12. Process according to one or more of items 1 to 11, wherein the bio-resorbable polyester is a copolymer of DL-lactide or L-lactide and glycolide.

13. Process according to one or more of items 1 to 12, wherein the bio-resorbable polyester is a copolymer of lactide and trimethylene carbonate.

14. Process according to one or more of items 1 to 13, wherein the bio-resorbable polyester is a copolymer of lactide and epsilon-caprolactone.

15. Process according to one or more of items 1 to 14, wherein the bio-resorbable polyester is a terpolymer.

16. Process according to one or more of items 1 to 15, wherein the container comprises or consists of plastic or steel.

17. Process according to one or more of items 1 to 16, wherein the one or more container(s) comprises or consists of a polyolefin.

18. Process according to one or more of items 1 to 17, wherein the container comprises or consists of polypropylene.

19. Process according to one or more of items 1 to 18, wherein the container comprises or consists of fluorinated or partially fluorinated polymers.

20. Process according to one or more of items 1 to 19, wherein the container comprises or consists of polytetrafluoroethane.

21. Process according to one or more of items 1 to 20, wherein the internal volume of the container is between 50 ml and 10 liters.
22. Process according to one or more of items 1 to 21, wherein the internal volume of the container is between 250 ml and 2.5 liters.
23. Process according to one or more of items 1 to 22, wherein the chain length moderator is dodecanol.
24. Process according to one or more of items 1 to 23, wherein the catalyst is Tin(II) 2-ethylhexanoate.
25. Process according to one or more of items 1 to 24, wherein the polymerization reaction is carried out for 0.5 to 25 days, more preferably for 1 to 10 days, particularly for 2 to 9 days.
26. Process according to one or more of items 1 to 25, wherein the polymerization reaction is carried out for 3 to 15 days.
27. Process according to one or more of items 1 to 26, wherein the polymerization reaction is carried out for 3 to 7 days.
28. Process according to one or more of items 1 to 27, wherein the polymerization is carried out at a temperature in the range of 50° C. to 170° C.
29. Process according to one or more of items 1 to 28, wherein the polymerization is carried out at a temperature in the range of 100° C. to 140° C.
30. Process according to one or more of items 1 to 29, wherein the polymerization reaction in step e) in carried out in a reaction time and temperature from 5 hours to 15 days at 50 to 170° C., preferably from 3 to 7 days at 100 to 140° C., most preferably from 4 to 6 days at 110 to 130° C.
31. Process according to one or more of items 1 to 30, wherein a degree of polymerization is reached where of the monomers used less than 10% by weight are present in the polymer as residual monomers.
32. Process according to one or more of items 1 to 31, wherein a degree of polymerization is reached where of the monomers used 0 to 9% by weight are present in the polymer as residual monomers.
33. Process according to one or more of items 1 to 32, wherein a degree of polymerization is reached where of the monomers used 0.1 to 7 by weight are present in the polymer as residual monomers.

EXAMPLES

Example 1: (Inventive) "Catalyst and Moderator in the Middle, Standing Bottles"

A high molecular-weight polylactide should be synthesized.

The desired specification was an inherent viscosity (IV) of 3.25-4.34 dL/g and a residual monomer content of 3.0% by weight or less (Resomer® L210 S))

800 g L-lactide monomer granulate, 800 ppm (0.64 g) molecular chain moderator (dodecanol) and 15 ppm (0.0408 g) Tin(II) 2-ethylhexanoate as catalyst were poured under nitrogen ($N_2$) atmosphere into three polypropylene bottles of about 1 liter volume. All the materials and the three polypropylene bottles were weighted and filled under $N_2$ atmosphere. First, 400 g of L-lactide monomer were poured into one vertical standing bottle, then a mixture of the moderator and the catalyst, dissolved in 2 ml toluene, were poured dropwise with the help of a syringe in the middle on top of the monomer granulate. Then, 400 g of L-lactide monomer were added on top, so that the molecular chain moderator and the catalyst were placed centric on top of the monomer granulate. The bottles were closed tightly under $N_2$ atmosphere with a cap. The bottles were placed standing in a vertical position in an oven previously heated to 120° C. The oven was filled with $N_2$ atmosphere. The bottles remained in the oven for 120 hours for polymerization. The bottles were left in the standing position (vertical).

After the polymerization, the bottles were left inside the oven under $N_2$ atmosphere for cooling down to room temperature. The wall of the bottles were cut by a knife and removed to set the polymer block free. Samples of polymer material were taken out by means of a 0.5 cm diameter drill by drilling in the middle of the upper half (top) of the polymer block (relative to the previous standing position of the bottle) or in the middle of the lower half (bottom).

Inherent viscosity (IV) prior to monomer extraction was measured.

The results of the samples indicate that the resulting polymer is homogeneous within the desired specification.

Samples from bottle 1: bottom 3.31 dL/g and top 3.28 dL/g.

Samples from bottle 2 bottom 3.83 dL/g and top 3.38 dL/g.

Samples 3 from bottle 3: bottom 3.54 dL/g and top 3.54 dL/g.

The residual monomer was measured by gas chromatography

Samples from bottle 1: bottom 0.6% and top 4.9% by weight.

Samples from bottle 2: bottom 0.3% and top 3.4% by weight.

Samples from bottle 2: bottom 0.3% and top 6.0% by weight.

The polymer material from all three bottles was milled to a mixed powder. The mixed powder was filled into a cartridge and residual monomer was extracted with supercritical $CO_2$ (about 75 bar and 30-50° C.). After the extraction, the value of the inherent viscosity was 3.56 dL/g and therefore within the expected range of 3.25-4.34 dL/g. The residual monomer content was below the required upper limit of 3.0% by weight.

Example 2: (Comparative) "Catalyst and Moderator on Top, Laying Bottles

A high molecular-weight polylactide should be synthesized.

The desired specification was an inherent viscosity (IV) of 3.25-4.34 dL/g and a residual monomer content of 3.0% by weight or less (Resomer® L 210 S).

800 g L-lactide monomer granulate, 800 ppm molecular chain moderator (dodecanol) and 15 ppm Tin(II) 2-ethylhexanoate as catalyst were poured into a polypropylene bottle of about 1 liter volume about 21 cm in height with about 7 cm diameter. All the materials and the polypropylene bottle were weighted and filled under $N_2$ atmosphere. First 800 g of L-lactide monomer were poured into the vertical standing bottle, than a mixture of the moderator and the catalyst, dissolved in 2 ml toluene, were poured dropwise with the help of a syringe centric on top of the monomer granulate. The bottle was closed under the $N_2$ atmosphere with a cap. The bottle was placed laying in a horizontal position in an oven previously heated to 120° C. using $N_2$ as protective gas. The bottle remained in the oven for 120 hours for polymerization. The bottle was left in a laying position (horizontal).

After the polymerization, the bottle was left inside the oven under $N_2$ atmosphere for cooling down to room temperature. The wall of the bottle was cut by a knife and removed to set the polymer block free. Samples of polymer material were taken out by means of a 0.5 cm diameter drill by drilling in the middle of the upper half (top) of the polymer block (relative to the previous standing position after filling of the bottle) or in the middle of the lower half (bottom).

The results indicate that the samples of the polymer are quite homogeneous in respect to inherent Viscosity (IV) but not within the desired specification.

bottom 1.64 dL/g and top 1.42 dL/g.

The residual monomer was measured by gas chromatography and found to be much too high.

bottom 53.2% by weight and top 52.4% by weight.

Furthermore a plate with yellowish color was found within the polymer material, containing high molecular weight polymer but being very inhomogeneous. Due to the high amount of residual monomer, no extraction was carried out.

Example 3: (Comparative) "Catalyst and Moderator on Top, Laying Bottle"

A "middle" molecular-weight polylactide should be synthesized.

The desired specification was an inherent viscosity of 1.45-2.04 dL/g and a residual monomer content of 3.0% by weight or less (Resomer® L 207 S).

800 g L-lactide monomer granulate, 1200 ppm molecular chain moderator (dodecanol) and 15 ppm Tin(II) 2-ethylhexanoate as catalyst were poured into a polypropylene bottle of about 1 liter volume. All the materials and the polypropylene bottle were weighted and filled under $N_2$ atmosphere. First 800 g of L-lactide monomer were poured into the vertical standing bottle, than a mixture of the moderator and the catalyst, dissolved in 2 ml toluene, were poured dropwise with the help of a syringe centric on top of the monomer granulate. The bottle was closed under the $N_2$ atmosphere with a cap. The bottle was placed laying in a horizontal position in an oven previously heated to 120° C. using $N_2$ as protective gas. The bottle remained in the oven for 120 hours for polymerization. The bottle was left in a laying position (horizontal).

After the polymerization, the bottle was left inside the oven under $N_2$ atmosphere for cooling down to room temperature. The wall of the bottle was cut by a knife and removed to set the polymer block free. Samples of polymer material were taken out by means of a 0.5 cm diameter drill by drilling in the middle of the upper half (top) of the polymer block (relative to the previous standing position after filling of the bottle) or in the middle of the lower half (bottom).

The results indicate that the samples of the polymer are homogeneous in respect to inherent viscosity (IV) prior to monomer extraction of 1.25 dL/g but not within the desired specification. The residual monomer was measured by gas chromatography and found to be much too high with 12.5% by weight.

The sample color was inhomogeneous, probably due to the high residual monomer content. Then the polymer material from all three bottles was milled to a mixed powder. The mixed powder was filled into a cartridge and residual monomer was extracted by passing $CO_2$ at supercritical stage (about 75 bar and 30-50° C.) through the cartridge. After the extraction, the value of the inherent viscosity was 1.43 dL/g and therefore slightly below the specified range of 1.45-2.04 dL/g. The residual monomer content was below the required upper limit of 3.0% by weight.

Example 4: (Comparative) "Catalyst and Moderator on Top, Laying Bottle"

A low molecular-weight polylactide should be synthesized.

The desired specification was an inherent viscosity of 0.75-1.24 dL/g and a residual monomer content of 3.0% by weight or less (Resomer® L 206 S)

800 g L-lactide monomer granulate, 5000 ppm molecular chain moderator (dodecanol) and 15 ppm Tin(II) 2-ethylhexanoate as catalyst were poured into a polypropylene bottle of about 1 liter volume about 21 cm in height with about 7 cm diameter. All the materials and the polypropylene bottle were weighted and filled under $N_2$ atmosphere. First 800 g of L-lactide monomer were poured into the vertical standing bottle, than a mixture of the moderator and the catalyst dissolved in toluene were poured with the help of a syringe on top dropwise centric of the monomer granulate. The bottle was closed under the $N_2$ atmosphere with a cap. The bottle was placed laying in a horizontal position in an oven previously heated to 120° C. using $N_2$ as protective gas. The bottle remained in the oven for 120 hours for polymerization. The bottle was left in a laying position (horizontal). After the polymerization, the bottle was left inside the oven under $N_2$ atmosphere for cooling down to room temperature. The wall of the bottle was cut by a knife and removed to set the polymer block free. Samples of polymer material were taken out by means of a 0.5 cm diameter drill by drilling in the middle of the upper half (top) of the polymer block (relative to the previous standing position after filling of the bottle) or in the middle of the lower half (bottom).

After the polymerization, the bottle was left inside the oven under $N_2$ atmosphere for cooling down to room temperature. The results indicate that the samples are homogeneous with inherent viscosity (IV) prior to monomer extraction with a bottom sample 1.04 dL/g and a top sample of 1.06 dL/g. The values of residual monomer were bottom sample 2.7% by weight and top sample 0.2% by weight. However a plate with high molecular-weight polymer was found inside the polymer block, which had a yellowish color. Thus the polymerization reaction was regarded as in homogeneous and out of the specification.

The polymer material was milled to a powder. The powder was filled into a cartridge and residual monomer was extracted by passing $CO_2$ at supercritical stage through the cartridge. After the extraction of the value of the inherent viscosity was 1.07 dL/g (bottom and top) and therefore within the specified range of 0.75-1.24 dL/g. The residual monomer content was below the required upper limit of 3.0% by weight.

Example 5: (Inventive) "Catalyst and Moderator in the Middle, Standing/Laying Bottles"

A high molecular-weight polylactide should be synthesized.

The desired specification was an inherent viscosity (IV) of 3.25-4.34 dL/g and a residual monomer content of 3.0% by weight or less (Resomer® L 210 S)

800 g L-lactide monomer granulate, 800 ppm molecular chain moderator (dodecanol) and 15 ppm Tin(II) 2-ethylhexanoate as catalyst were poured each into one into of three polypropylene bottles (about 1 liter volume). All the materials and the three polypropylene bottles were weighted and filled under $N_2$ atmosphere. First 400 g of L-lactide monomer were poured into the vertical standing bottles, than a mixture of the moderator and the catalyst, dissolved in 2 ml toluene, were poured dropwise with the help of a syringe in centric on top of the monomer granulate of the monomer granulate of each bottle. Then 400 g of L-lactide monomer were added on top into each bottle. So that the molecular chain moderator and the catalyst were placed in the middle of the monomer granulate of each bottle. The bottles were closed under the $N_2$ atmosphere with a cap. Two bottles were placed standing in a vertical position and one bottle laying in a horizontal position in an oven previously heated to 120° C., using $N_2$ as protective gas. The bottles remained in the oven for 120 hours for polymerization. The bottles were left in their standing (vertical) respectively in the laying position (horizontal).

After the polymerization, the bottles were left inside the oven under $N_2$ atmosphere for cooling down to room temperature. The wall of the bottles were cut by a knife and removed to set the polymer block free. Samples of polymer material were taken out by means of a 0.5 cm diameter drill by drilling in the middle of the upper half (top) of the polymer block (relative to the previous standing position of the bottle) or in the middle of the lower half (bottom).

The results indicate that the samples are homogeneous enough with inherent viscosity (IV) prior to monomer extraction of Sample 1 (standing bottte) bottom 3.61 dL/g and top 3.76 dL/g.

Sample 2 (standing bottle) bottom 4.05 dL/g and top 4.04 dL/g.

Sample 3 (laying bottle) bottom 4.00 dL/g and top 3.73 dL/g.

The values of residual monomer were

Sample 1 bottom<0.54% by weight and top<0.54% by weight.

Sample 2 bottom<0.54% by weight and top<0.54% by weight.

Sample 3 (laying) bottom<0.54% by weight and top<0.54% by weight.

The polymer material from all three bottles was milled to a mixed powder. The mixed powder was filled into a cartridge and residual monomer was extracted with supercritical $CO_2$ (about 75 bar and 30-50° C.). After the extraction of the value of the inherent viscosity was 3.87 dL/g and therefore within the expected range of 3.25-4.34 dL/g. The residual monomer content was below the required upper limit of 3.0% by weight.

The invention claimed is:

1. A process for preparing a bio-resorbable polyester as a granulate or powder by bulk polymerization of one or more monomer(s), the process comprising a) to g):
   a) filling a monomer granulate having a mean particle size in a range from about 0.5 to 3 mm, comprising the one or more monomer(s), into a container,
   b) adding a polymerization catalyst and a chain length moderator on top of the monomer granulate,
   c) adding further of the monomer granulate on top of the polymerization catalyst and the chain length moderator,
   d) closing the container,
   e) carrying out a polymerization reaction in the closed container at a temperature in the range of 50° C. to 170° C., wherein a solid polymer in the form of a polymer block is formed,
   f) removing the polymer block from the container, and
   g) comminuting the polymer block to a granulate or powder,
   wherein the container is an unstirred container,
   wherein b) and c) are carried out once or are repeated, and
   wherein a) to e) are carried out under inert atmosphere.

2. The process according to claim 1, comprising:
   a) filling a first amount of the monomer granulate of 10 to 90% by weight of a total amount of the monomer granulate of 100% by weight, into a container,
   b) adding a polymerization catalyst and a chain length moderator on top of the monomer granulate in the container,
   c) adding a second amount of the monomer granulate of the one or more monomer(s) into the container, so that the first amount and the second amount add up to 100% by weight of the monomer granulate, wherein the second amount of monomer granulate covers the polymerization catalyst and the chain length moderator on top of the first amount of the monomer granulate from a),
   d) closing the container,
   e) carrying out a polymerization reaction in the closed container at a temperature in the range of 50° C. to 170° C., wherein a solid polymer in the form of a polymer block is formed,
   f) removing the polymer block from the container, and
   g) comminuting the polymer block to a granulate or powder,
   wherein the container is an unstirred container,
   wherein b) and c) are carried out once, and
   wherein a) to e) are carried out under inert atmosphere.

3. The process according to claim 1, wherein a residual monomer from the resulting polymer granulate or powder from g) is extracted by $CO_2$.

4. The process according to claim 1, wherein the bio-resorbable polyester has an inherent viscosity IV in the range of 0.5 to 8 dl/g.

5. The process according to claim 1, wherein the bio-resorbable polyester is a polylactide or a polyglycolide.

6. The process according to claim 1, wherein the bio-resorbable polyester is selected from the group of a poly(L-lactide), a copolymer of D- and L-lactides, a copolymer of L-lactide and DL-lactide, a poly(DL-lactide), a copolymer of glycolide and trimethylene carbonate, a copolymer of lactide and glycolide, a copolymer of DL-lactide or L-lactide with glycolide, a copolymer of lactide and trimethylene carbonate, and a copolymer of lactide and epsilon-caprolactone.

7. The process according to claim 1, wherein the container comprises plastic or steel.

8. The process according to claim 1, wherein the container comprises a polyolefin.

9. The process according to claim 1, wherein the container comprises polypropylene.

10. The process according to claim 1, wherein the container comprises a fluorinated or partially fluorinated polymer.

11. The process according to claim 1, wherein an internal volume of the container is from 50 ml and 10 liters.

12. The process according to claim 1, wherein an internal volume of the container is from 500 ml to 1.2 liters.

13. The process according to claim 1, wherein the chain length moderator is dodecanol.

14. The process according to claim 1, wherein the catalyst is Sn(II) 2-ethylhexanoate.

15. The process according to claim 1, wherein the polymerization reaction in e) is carried out at a reaction time and temperature from 5 hours to 15 days at 50 to 170° C.

16. The process according to claim 1, wherein in e), the polymerization reaction is carried out in the closed container at a temperature in the range of 100 to 150° C.

17. The process according to claim 2, wherein in a), the first amount of the monomer granulate is 20 to 80% by weight of a total amount of the monomer granulate.

18. The process according to claim 4, wherein the bioresorbable polyester has an inherent viscosity IV in the range of 0.6 to 5 dl/g.

19. The process according to claim 11, wherein the internal volume of the container is from 250 ml to 2.5 liters.

20. The process according to claim 15, wherein the polymerization reaction in e) is carried out at a reaction time and temperature from 4 to 6 days at 110 to 130° C.

21. The process according to claim 1, wherein the polymerization reaction in e) is carried out at a reaction time of 3 to 15 days.

* * * * *